US008868391B2

(12) United States Patent
Grandi

(10) Patent No.: US 8,868,391 B2
(45) Date of Patent: Oct. 21, 2014

(54) PROCESS FOR CHARACTERISING THE EVOLUTION OF AN OIL OR GAS RESERVOIR OVER TIME

(75) Inventor: Andrea Grandi, Sola (NO)

(73) Assignee: Total S.A., Paris (FR)

(*) Notice: Subject to any disclaimer, the term of this patent is extended or adjusted under 35 U.S.C. 154(b) by 408 days.

(21) Appl. No.: 13/375,973

(22) PCT Filed: Jun. 3, 2010

(86) PCT No.: PCT/GB2010/050934
§ 371 (c)(1),
(2), (4) Date: Feb. 29, 2012

(87) PCT Pub. No.: WO2010/139998
PCT Pub. Date: Dec. 9, 2010

(65) Prior Publication Data
US 2012/0158382 A1    Jun. 21, 2012

(30) Foreign Application Priority Data

Jun. 4, 2009    (GB) .................................. 0909599.3

(51) Int. Cl.
G06F 7/48    (2006.01)
G01V 1/30    (2006.01)

(52) U.S. Cl.
CPC ........................................ *G01V 1/30* (2013.01)
USPC ............................................................ 703/10

(58) Field of Classification Search
None
See application file for complete search history.

(56) References Cited

U.S. PATENT DOCUMENTS 5,586,082 A * 12/1996 Anderson et al. ............... 367/73
5,764,515 A *  6/1998 Guerillot et al. ................. 702/2
7,577,061 B2 *  8/2009 Williamson et al. ........... 367/38
2008/0189043 A1  8/2008 Anno et al.

FOREIGN PATENT DOCUMENTS

EP        1865340 A1    12/2007

OTHER PUBLICATIONS

Rickett et al., "Compaction and 4-D Time Strain at the Genesis Field", 2006 SEG Annual Meeting, Oct. 2006, pp. 3215-3219.*
Ajo-Franklin, Jonathan B. et al., "Applying compactness constraints to differential traveltime tomography", Jul.-Aug. 2007, Geophysics vol. 72, No. 4, pp. R67-R75.
Harris, Jerry M., et al., "Geologic Storage of $CO_2$ Subsurface Monitoring of $CO_2$ Sequestration in Coal", May 2008, GCEP Annual Report, pp. 1-35.
Hodgson, N. et al., "Inverting for Pressure Using Time-Lapse Time-Straiin—Application to a Compacting GOM Reservoir", EAGE 69th Conference & Exhibition—London, UK, Jun. 2007, (5 pages).
Lafet, Y., et al., "Global 4-D Seismic Inversion and Fluid Prediction", Jun. 2008, 70th EAGE Conference & Exhibition—Rome, Italy, (5 pages).

(Continued)

Primary Examiner — Thai Phan
Assistant Examiner — Herng-Der Day
(74) Attorney, Agent, or Firm — Winstead PC

(57) ABSTRACT

Disclosed is a process for characterising the evolution of a reservoir over a time lapse comprising the steps of: providing a base and a plurality of monitor surveys of the reservoir, each having a set of seismic traces at different times; deriving an optimal regularization weight-map from a combination of at least three surveys; and using the optimal regularization weights to invert and obtain an improved time lapse seismic image between pairs of seismic surveys.

12 Claims, 8 Drawing Sheets

(56) References Cited

OTHER PUBLICATIONS

Santos, E.T.F. et al., "L- and Θ -curve approaches for the selection of regularization parameter in geophysical diffraction tomography", 2007, Computers & Geosciences 33, 618-629.

Vasconcelos, I. et al., "Estimation of azimuthally varying attenuation from surface seismic data", 2005, CWP Project Review, (18 Pages).

Meyer, Matthias, "International Search Report" for PCT/GB2010/050934, as mailed Sep. 19, 2011, 5 pages.

* cited by examiner

PROCESS FOR CHARACTERISING THE EVOLUTION OF AN OIL OR GAS RESERVOIR OVER TIME

BACKGROUND

1. Field of the Invention

The present invention relates generally to the field of geosciences and more particularly to seismic data processing. Specifically the invention relates to a method to extract the time-lapsed changes in 3D seismic data sets collected over a production period to integrate with production data and assist in understanding and managing the extraction of oil and gas from reservoirs or the injection of other fluids into the reservoirs.

2. History of the Related Art

In the oil and gas industry, seismic surveys are carried out in order to provide subsurface images so that accumulations of hydrocarbons or other fluids might be identified. In a seismic survey, one or several sources emit elastic waves in the form of pressure or ground motion modulation from specific locations (wavefield), at or below the land or sea surface or in a borehole. This wavefield propagates away from the source(s) through the subsurface. Along with this propagation, a fraction of the incident wavefield is reflected from the fraction of the global heterogeneities in the elastic material properties of the subsurface (such as acoustic impedance). This excitation by the incident wavefield generates a reflected wavefield from the heterogeneities, which manifests as pressure, particle motion or some derived quantities and can be detected and recorded at the surface or in a borehole at a number of receiver locations.

Processing of the measurements is undertaken so as to construct a 3D image of the sub-surface. Repeated surveys at selected time intervals (days, months, years) allow observation of the changes in, over or under a given reservoir across the time interval—e.g. before oil or gas production starts and after some period of production or injection and to compare the results of measurements. This is called 4D seismic and involves comparing 3D seismic surveys carried out at different time instances. The aim is to observe changes in the state of the formations and fluids consequent upon production of hydrocarbons from or the injection of fluids into a reservoir. Proper detection of the changes and proper identification of the effects, factors and processes requires specialised acquisition techniques and data processing steps.

Such a technique applied to detect 4D changes is hereafter referred to as 3D warping. The data within the seismic data sets is first realigned or conditioned to compensate for variations in acquisition (or non-repeatability of seismic surveys) and changes in velocity in the sub-surface. The standard technique makes use of cross-correlation between different vintages in selected windows. Such a window is a time interval representing a portion of a trace. The window is set across traces for correlation and thus should contain all the 4D effects. One problem with these correlation-based approaches is the size of the correlation window. If the window used for correlation is too large, the accuracy of correlation is likely to be affected: indeed, the correlation value will then depend not only on differences between the survey at the point being considered, but also on other effects, apart from the points being considered. If the window used for correlation is too small, correlation is likely to be severely affected by noise and non-repeatability of the surveys, including changes due to the effects whose observation is desired.

In EP 1 865 340 to the Applicant, and incorporated herein by reference, the evolution of an oil reservoir in the process of producing is carried out by jointly inverting for the changes in the propagation times and seismic amplitudes of a seismic wavelet along propagation paths in the ground. Inverting allows us to back filter, in effect, deriving the original from the solution. A base survey of the reservoir is provided, with a set of seismic traces at a first time T associated to a first velocity field $V_b$; a monitor survey of the reservoir is provided, the monitor survey being taken at a second time T+$\Delta$T, with a set of seismic traces associated to the same positions as in the base survey; the monitor survey is associated to a second velocity field $V_m$. For a set of samples i in the base survey, one computes over the samples of the set the sum S of a norm of the difference between the amplitude $b_i$ of the seismic trace in the base survey at each sample i and the sum of the amplitude $m_{i'}$ of the seismic trace at a time-corresponding i' in the monitor survey and the amplitude due to the reflectivity change local to the time-corresponding sample i' induced by the difference between the first velocity field $V_b$ and the second velocity field $V_m$; the time-corresponding sample i' being shifted in time by a time-shift derived from the velocity changes along the propagation path from the surface to time-corresponding sample i'. This sum is minimised to derive the velocity changes from the base survey to the monitor survey and thus characterise the evolution of the oil reservoir.

This analysis is based on the fact that changes in the reservoir, due to exploitation, will cause changes to the petrophysical properties of the rock and therefore to the seismic velocity field. Practically, oil will be substituted by gas or water and/or the fluid pressure will change, causing changes in saturation, porosity, permeability and pressure, and consequently changes in velocity. Changes within the reservoir may also change the stress and strain state of the surrounding rocks, further causing changes in their velocities. These changes to velocity will produce time shifts in the seismic expression of underlying reflectors and associated changes in reflectivity, causing a change in the local wavefield. By using an inversion technique, for every point in the 3D volume, an estimate of the 4D changes having occurred in the time lapse between collection of the base and monitor surveys is provided. It is therefore possible to deduce a field of 4D velocity changes without having to proceed with cross correlation of the traces.

Although the 4D inversion problem seems rather easy to formulate as the minimisation of a difference between base and monitor seismic data, it is an ill-posed problem that has multiple solutions: for instance zero-mean velocity changes map into zero time-shift. Moreover the inversion becomes even more highly non-linear for fields that induce subsidence and have potentially large time shift.

In EP 1 865 340, the crucial step is in minimising the sum. Essentially this is an optimisation problem which requires minimising of the objective function or cost function over all choices of variables i.e. velocity changes that satisfy the modelled constraints. In warping, the cost function can typically be derived as $$C = \sum_{i=1}^{N} \left( b(t_i) - m\left(t_i - t_s \sum_{k=1}^{i} \frac{\Delta V}{V}(k)\right) + \left(w(t) * \frac{\Delta V}{V}(t)\right)_i \right)^2 \quad (1)$$

where b and m are respectively the base and the monitor trace, $t_s$ is the sampling rate of the seismic data, $$\frac{\Delta V}{V}$$

is the relative velocity 4D change, w is the seismic wavelet and * denotes the convolution between the wavelet and the relative velocity change to model the 4D amplitude change.

However, as in almost any inverse problem, this cost function does not go identically to zero. In fact the forward model used for this inversion, is just an approximation of the vertical propagation that, although good, implies some assumptions and therefore a residual still exists. This is a major disadvantage of the technique proposed in EP 1 865 340, as it provides a highly unstable solution. Moreover the seismic data are affected by noise and this is seen as an additional residual after the inversion process.

A well known method to deal with approximated forward models and noise is by adding a regularisation term to the cost function. Other techniques are known, but regularisation imposes constraints on the results and thus avoids overfitting of the data and the noise. In effect we constrain the solution to the point that it does not need to be minimised. The cost function can be considered as the seismic mismatch together with the regularisation:

$$C = \sum_{i=1}^{N}\left(b(t_i) - m\left(t_i - t_s\sum_{k=1}^{i}\frac{\Delta V}{V}(k)\right) + \left(w(t) * \frac{\Delta V}{V}(t)\right)_i\right)^2 + \lambda\sum_{i=1}^{N}f\left(\frac{\Delta V}{V}(t_i)\right). \quad (2)$$

The regularisation weight λ expresses a trade off between modelling the 4D changes from seismic and imposing constraints on the solutions. There are many forms of regularisation using any function $f$ of the relative velocity change.

In order to select the optimal regularisation, a number of steps are performed on the base and monitor seismic survey data:
1. Select a number of locations or seismic traces representative of the seismic quality;
2. Warp the data in these locations for different regularisation weights;
3. Cross-plot the cost function terms i.e. seismic mismatch against the regularisation term to provide a regularisation weight-map;
4. From a range of valid solutions determined from the plot, select the best solution to the regularisation value according to the available production history and geological information of the reservoir.
5. Interpolate the optimal regularisation values across the whole common seismic survey area to obtain the time lapsed seismic image between the base and monitor surveys.

FIG. 1 illustrates such a cross-plot, showing four distinct regions. At A, there is no solution as the warping is trapped in a local minimum and does not converge. At B, moving to stronger regularisations, we obtain under-regularised solutions where perfect fitting of the seismic occurs but the solution is non-physical. Note this is the region of solutions for the minimisation of the sum approach proposed in EP 1 865 340. At C, we have the optimal balancing between seismic fitting and regularisation and this is the area that has to be further investigated. At D, over regularised solutions where the time shift is zero everywhere, the warped trace does not change from the monitor and the difference between warped and base is a constant.

At optimal balancing (area C), a regularisation value can be selected by using production data and geological information, that gives some hints about the expected 4D anomaly. It is therefore seen that the choice of regularisation method and regularisation weight turns out to be the most critical parameter to achieve geologically plausible solutions. Once the regularisation parameter is estimated in every selected location, then a 2D map of optimal parameters is obtained by interpolation and applied to the full data sets and a 4D inverted signal is then graphed to illustrate velocity changes and the evolution of the reservoir between the base and monitor surveys.

This process of determining the optimal regularisation weight is time intensive. While the step of warping data at the selected locations for different regularisation weights (Step 2) can be achieved on a trace by trace basis and does not require inversion of the 3D data set as a whole, the time to construct the cross plot and determine a regularisation is one to two orders of magnitude greater than the time required to run the inversion on the whole survey. Consequently, this process can take months to complete and thus the results are of historical use only since further changes in the reservoir will have taken place during this period. Such a delay limits their usefulness by a reservoir engineer who needs the information as soon as possible to take decisions on field management.

SUMMARY

It is an object of the present invention to provide a process for characterising the evolution of a reservoir which alleviates or mitigates at least some of the problems in the prior art.

It is a further object of the present invention to provide a process for characterising the evolution of a reservoir which is more data driven and thus does not require as much interpretation as the prior art.

It is a yet further object of the present invention to provide a process for characterising the evolution of a reservoir which is appreciably faster to compute than the prior art computational time of weeks.

According to a first aspect of the present invention there is provided a process for characterising the evolution of a reservoir over a time lapse, comprising the steps of:
providing n seismic surveys of the reservoir, each having a set of seismic traces associated to the same position, at a time $T_n$ and n>2;
deriving an optimal regularisation weight-map from a combination of n>2 surveys; and
using the optimal regularisation weights to invert and obtain an improved time lapsed seismic image between pairs of seismic surveys.

It has been discovered that deriving the optimal regularisation weight-map from additional data i.e. multiple surveys improves the time lapsed seismic image between any pair of surveys. Preferably all available surveys are used. Thus even for obtaining time lapse images between early years, the regularisation is improved by using later collected seismic surveys. Preferably, combining the cost function with the regularisation term across multiple surveys provides a weight-map in which the optimal solutions i.e. region C of FIG. 1 provide very similar results.

While we have used the simplified term 'optimal' for the regularisation weight-map, it will be understood by those skilled in the art that the weights can be adjusted between any pair of surveys to account for anomalies such as signal to noise ratio.

Thus in order to select the optimal regularisation at Step 3, above, the multiple surveys are combined in providing the cross-plot. In this way, the data can be matched naturally rejecting the 4D noise, and considerably less apriori knowledge is required to interpret the weight-map. Additionally, because the selection of the optimal regularisation parameter is data driven rather than provided by interpretation, the process can be performed in less time than the prior art.

It is noted that the invention uses multiple surveys i.e three or more compared to the prior art. Each additional survey increases the number of combinations of pairs. This increases the number of equations available i.e. for 10 surveys, 45 equations can be used; for 5 surveys, 10 equations and for 4 surveys, 6 equations. However as the number of surveys increases, the number of unknowns to be inverted increases more slowly as (n−1) i.e. 9, 4 and 3 respectively for our examples. This means that redundancy builds in as the number of surveys increases, making the process of the present invention very robust.

Preferably the cost function is expressed as an optimisation with respect to the velocity change parameters. In this way inversion is carried out for the relative velocity change. The regularisation term may also be expressed as the relative velocity change. It will be understood that these may also be referred to in terms of relative slowness changes.

Preferably, b is a first base (reference) seismic trace, and $m_n$ are subsequent monitor traces, such that the cost function which is inverted during the inversion is simplified as $$C = \|\bar{b} - \bar{m}_1\|_2^2 + \|\bar{b} - \bar{m}_2\|_2^2 + \|\bar{m}_1 - \bar{m}_2\|_2^2 + \\ \|\bar{b} - \bar{m}_3\|_2^2 + \|\bar{m}_1 - \bar{m}_3\|_2^2 + \|\bar{m}_2 - \bar{m}_3\|_2^2 + \ldots$$

plus a regularisation part where the 4D changes between any pair of seismics are summed. As in the previous formulation, the regularisation part is multiplied by a weight that still expresses the best trade off between fitting the data and imposing constraints on the solution. It will be understood by those skilled in the art that different weights can be used for any term of the cost function, either for the regularisation terms and for the difference between pairs of surveys. The subsequent monitor traces $m_n$, have had a shaping operator applied to compensate for time shift and 4D amplitude effects in order to match the base seismic. The vector notation is used to indicate that the cost function is computed with a window restricted to contain a majority of the 4D effects that can occur either in the reservoir or in the overburden in case of stress-sensitive reservoirs. The formula shows that the cost function minimises the difference between every combination (each of size 2) of the surveys.

Preferably a first survey is a survey recorded before production begins on the reservoir. This may be referred to as a base survey. In this way, full history of the field can be achieved. Alternatively, where such a survey is not available, the first available seismic may be employed as the base or reference and the history of the reservoir will be achieved starting from this moment.

The process may also apply inverting just for interval time shift (called also time strain) without taking into account any 4D amplitude effect.

One may also use any regularisation which advantageously may be better adapted to the data characteristics.

Preferably the cost function is computed with a window restricted to contain a majority of the 4D effects. Comparative traces from different surveys may be considered to determine the size of the window.

In another embodiment, the invention provides a computer program residing on a computer-readable medium, comprising computer program code means adapted to run on a computer all the steps of such a process.

BRIEF DESCRIPTION OF THE DRAWINGS

A process embodying the invention will now be described, by way of example only, and with reference to the accompanying drawings, of which.

DETAILED DESCRIPTION

Figure 2A:
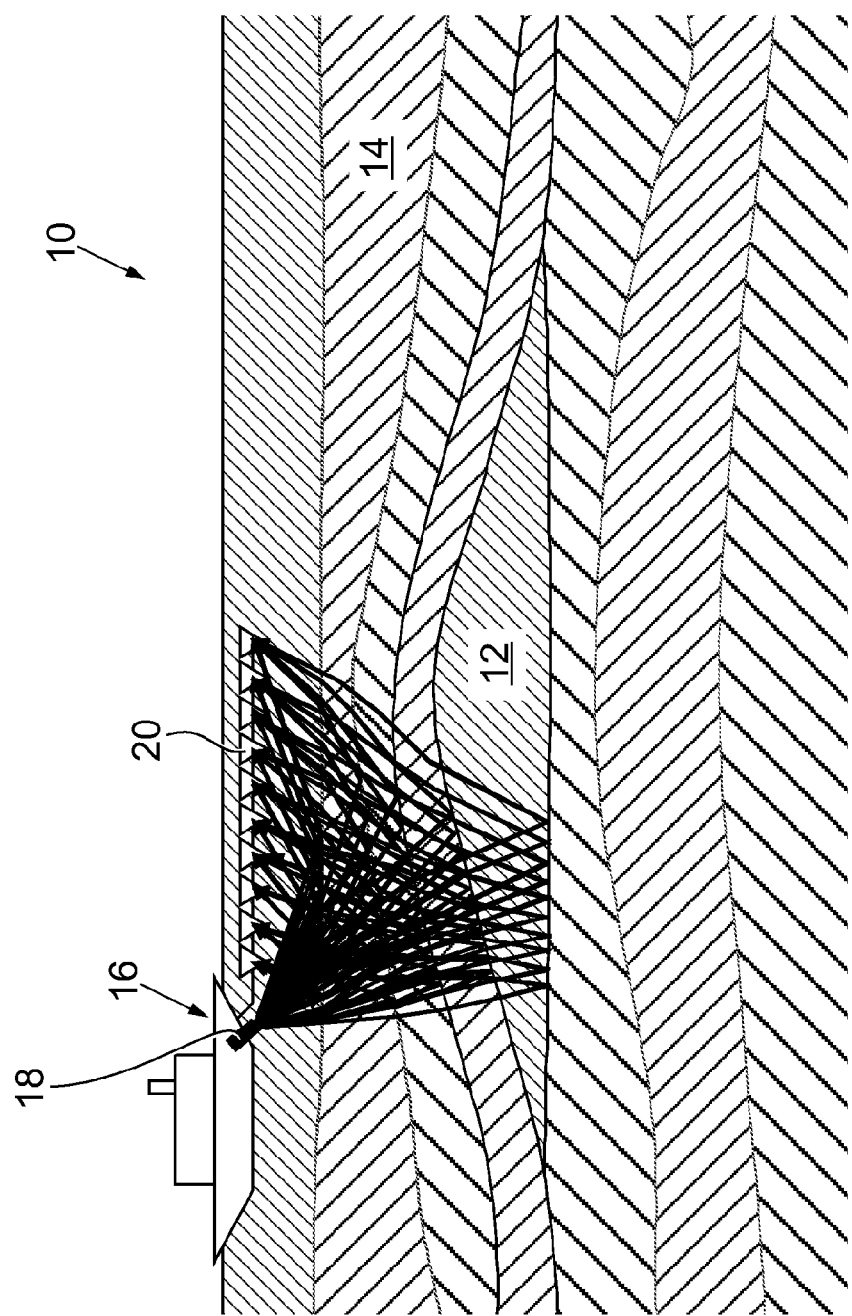
FIGS. 2(a) and (b) are schematic illustrations of a (a) base survey and (b) monitor survey being performed.

Referring initially to FIGS. 2(a) and (b) there is illustrated a reservoir, generally indicated by reference numeral 10, containing hydrocarbons 12 in the sub-surface 14. A survey vessel 16 upon which is located a sonar transmitter 18, being an acoustic source, and an array of receivers 20, performs a survey by travelling over the reservoir 10. The first or initial survey, FIG. 2(a), may be referred to as a base survey and is typically performed in the exploration phase before production begins.

The base survey of the reservoir 10 provides a set of seismic traces at a first time T. For a given trace, the base survey provides an amplitude b(t), that is an amplitude which is a function of time t; with digital recording and processing the trace is sampled at a set of values $t_i$, with i an index; typical trace lengths correspond to around 1000 samples. The trace is then handled as a set of values $b(t_i)$ or $b_i$.

Figure 2B:
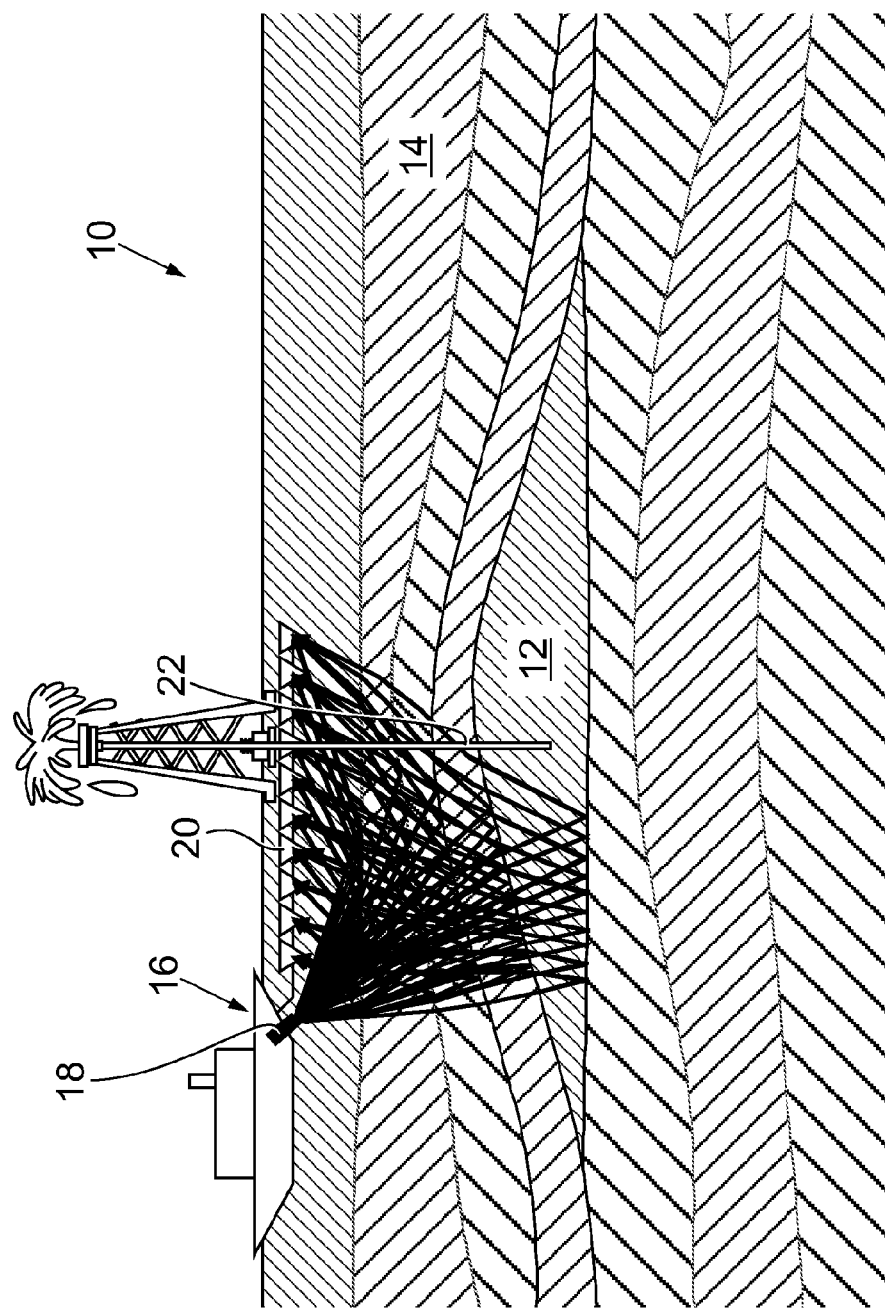

One or more wells 22 may be drilled in order to extract the hydrocarbons 12. As the reservoir 10 is produced oil will be substituted by gas or water and the fluid pressure will change. Additionally, enhanced oil recovery techniques may be applied wherein a fluid is injected into the reservoir at one or more locations giving changes in fluid pressure. Changes within the reservoir may also change the stress and strain state of the surrounding rocks. Thus when a further survey is carried out, FIG. 2(b), these changes will be seen due to a consequential change in the velocity field. These changes to velocity will produce time shifts in the seismic expression of underlying reflectors and associated changes in reflectivity, causing a change in the local wavefield.

Thus reservoir monitoring performs a monitor survey of the reservoir 10, taken at a second time T+ΔT, with a set of seismic traces. In the simplest assumption, T is a positive quantity, and the monitor survey is taken at a time later than the base survey; however, the order in which the surveys are taken is irrelevant to the operation of the process of the invention and, in principle, the time lapse T could as well be negative—which amounts to comparing the earlier survey to the later one. As for the base survey, a sampled trace in the monitor survey is represented as a set of values $m(t_i)$ or $m_i$.

For the present invention at least two monitor surveys are performed at different exploitation periods of the reservoir 10. Ideally, the traces in the monitor surveys are associated to the same positions as in the base survey. This is carried out by using, inasmuch as possible, the same equipment, acquisition geometry and processes for running the base survey and monitor surveys. Practically speaking, a difference of 5-10 m between the positions of sources and receivers still leads to acceptable results. Techniques such as interpolation may be used where traces in the monitor survey and in the base survey do not fulfil this condition.

As in the prior art we apply warping for correcting the differences due to 4D changes between a base seismic and a monitor seismic. EP 1 865 340 cast the warping as a non-linear inverse problem to obtain an interval attribute such as relative velocity change. In this way warping can generate attributes of direct interest for time-lapse interpretation, not only to align the traces of two vintages.

As described in EP 1 865 340, the inversion is posed as the match of the shifted monitor trace to the amplitude-adjusted base trace and is expressed as a least squares optimisation with respect to the velocity change parameters as illustrated in Equation (1). The main assumptions in this equation are that the propagation is nearly vertical, the velocity varies smoothly laterally and there is no compaction. The first two simplifications are commonly assumed in any warping technique; the third assumption, when not fulfilled, can be avoided by using a different cost function where instead of inverting for relative velocity change, we invert for time strain that is given both for compaction and velocity effects.

As realised above, to stabilise the solution and to input a-priori information a regularisation term is added to the cost function. This is as illustrated in Equation (2). Several kernels have been tested and they have to be adapted to the particular shape/bandwidth of the solution and to the level of 4D noise present in the sample. We have considered the classical Tikhonov regularisation in an L1 or L2 norm but other kernels could be used as well. Sometimes more than one term is needed and two of them have to be cascaded. The crucial aspect in this is to select the right regularisation parameter to balance fitting the data and regularising the solution.

In the present invention we modify the cost function to accommodate multiple surveys i.e. we have a base and then (n−1) monitor surveys. Here b is a first base (reference) seismic trace, and $m_n$ are subsequent monitor traces, such that the cost function which is inverted during the inversion is simplified as $$C = \|\bar{b} - \bar{m}_1\|_2^2 + \|\bar{b} - \bar{m}_2\|_2^2 + \|\bar{m}_1 - \bar{m}_2\|_2^2 +$$
$$\|\bar{b} - \bar{m}_3\|_2^2 + \|\bar{m}_1 - \bar{m}_3\|_2^2 + \|\bar{m}_2 - \bar{m}_3\|_2^2 + \ldots$$

plus a regularisation part where the 4D changes between any pair of traces are summed. As in the previous formulation, the regularisation part is multiplied by a weight that still expresses the best trade off between fitting the data and imposing constraints on the solution. A shaping operator has been applied to each monitor trace to compensate for time shift and 4D amplitude effects in order to match the base seismic. The vector notation is used to indicate that the cost function is computed along a window big enough to contain a majority of the 4D effects that can occur either in the reservoir or in the overburden in case of stress-sensitive reservoirs, but also small enough to reduce the amount of computation required and to ensure that a majority of the trace represents the 4D effects. It can be helpful to compare traces of different surveys to select an optimum window to use. The formula shows that the cost function minimises the difference between every combination (each of size 2) of the surveys.

Figure 3:
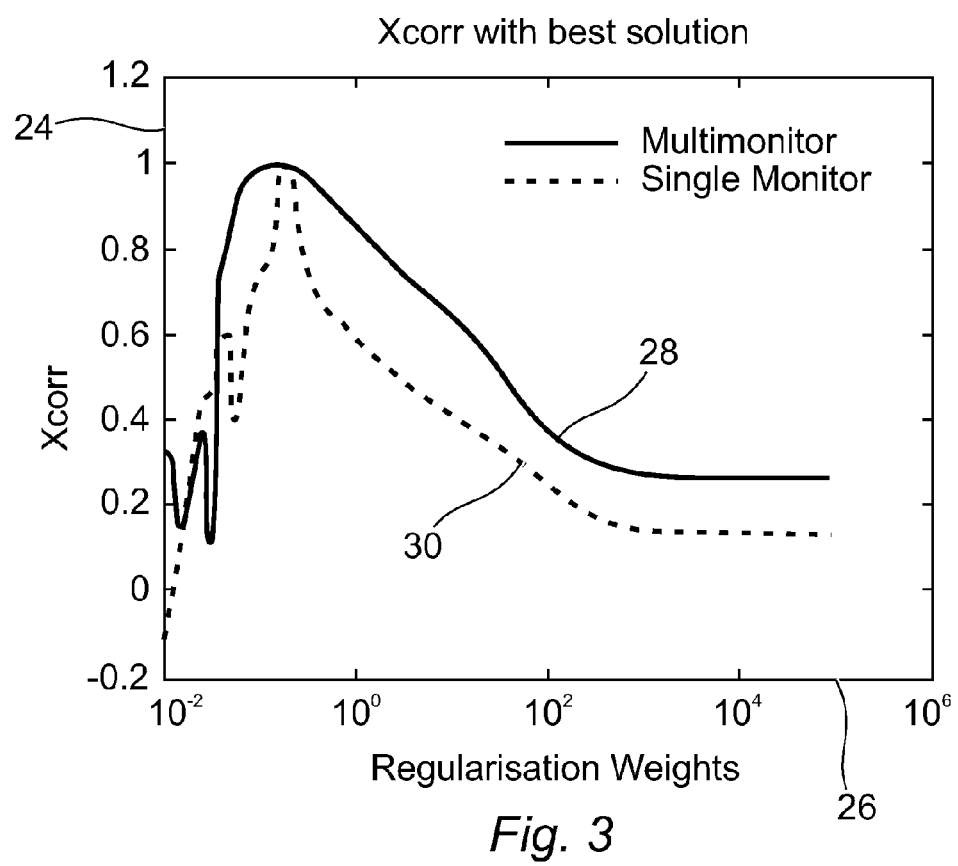
FIG. 3 is plot showing the cross-correlation between the best solution and every other solution computed with different regularisation weights between the present process and the prior art.

The benefits of having multiple equations from which to derive the regularisation parameters is best illustrated in FIG. 3. The figure represents the cross-correlation 24 between the best solution and every other solution computed with different regularisation weights 26. The curve 28 corresponding to the solutions computed with the multi-monitor technique i.e. the present invention is bell shaped, which shows that the regularisation weight gives substantially similar results for a large range of regularisation values. The single monitor curve 30 for the cross-correlations between the best solution obtained with the multi-monitor technique and the other solutions obtained for different regularisation weights is sharper and depicts that for the mono-monitor warping the choice of the regularisation is more critical and can severely affect the solution. Interestingly, once a good solution has been estimated with the multi-monitor warping, often it is possible to approach multi-monitor results with the mono-monitor warping although it remains inferior in terms of 4D noise rejection and the estimated 4D signal has inferior amplitude.

Figure 4:
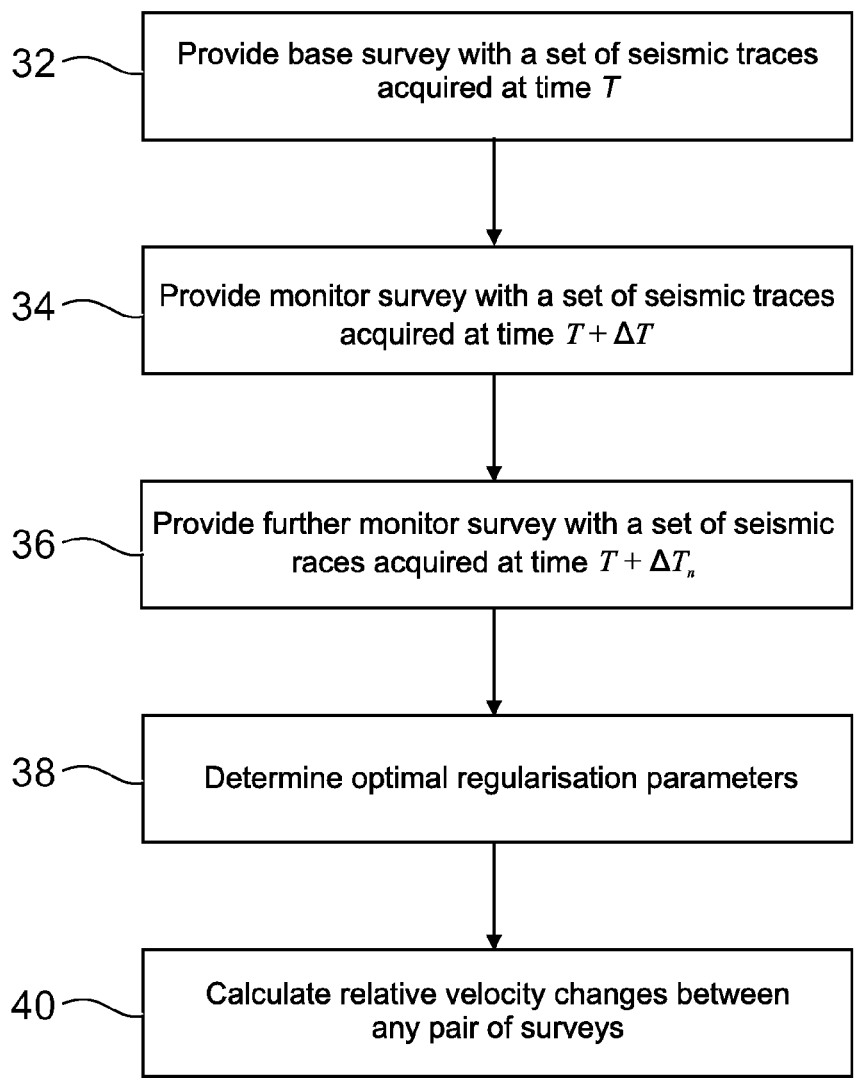
FIG. 4 is a flowchart of a process according to an embodiment of the invention.

Reference is now made to FIG. 4 of the drawings, showing a flowchart of a process according to an embodiment of the present invention. In step 32, there is a base survey as described above with reference to FIG. 2(a). In steps 34 and 36, there are a number of monitor surveys carried out at differing time durations in the life of the reservoir. Step 36 is repeated any number of times to accumulate the total number of seismic surveys performed on the reservoir. It is noted that while we describe a base survey as that performed prior to production, this need not be the case and any set of surveys collected for the same reservoir over differing time periods may be used. Even if we have two seismic vintages before production, this information could be exploited by the process improving 4D signal estimation.

Figure 1:
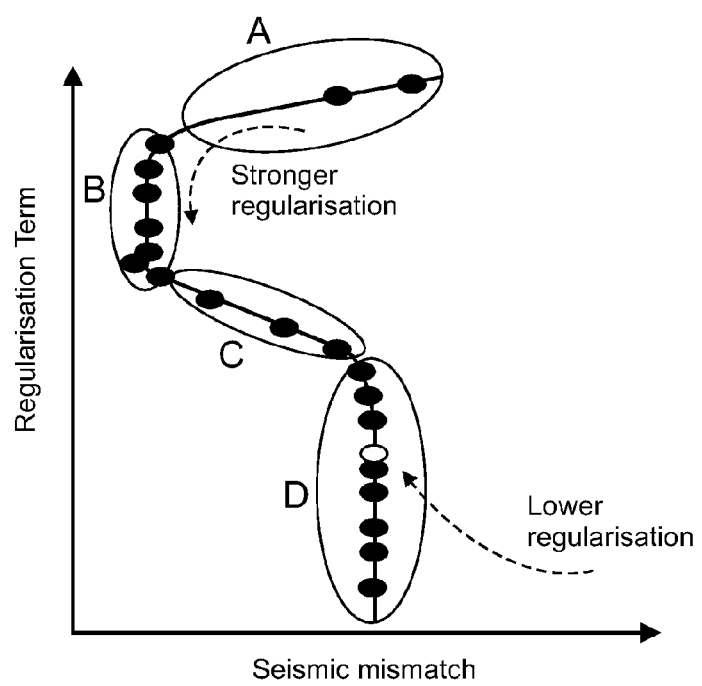
FIG. 1 illustrates a cross-plot, of the seismic mismatch (data misfit) against the regularisation term (model misfit)

In step 38, we determine the optimal regularization parameter. This is performed as for the prior art, but the cross-plot derived will now only show values in the optimal region i.e. region C of FIG. 1. Indeed there will be a constrained number of values to select from and, as a result, less apriori knowledge of the production history and geological information is required to derive the optimal regularisation parameter. The parameter could either be the same for every combination of surveys or differ if any of the surveys has different features, such as signal to noise ratio, and therefore requires particular care.

Each additional survey increases the number of combinations of pairs. This increases the number of equations available i.e. for 10 surveys, 45 equations can be used; for 5 surveys, 10 equations and for 4 surveys, 6 equations. However as the number of surveys increases, the number of unknowns to be inverted increases more slowly as (n−1) i.e. 9, 4 and 3 respectively for our examples. This means that redundancy builds in as the number of surveys increases, making the process of the present invention very robust. Thus step 38 can be performed quickly, meaning that the process can be performed in less time than for the mono-monitor case as a reservoir model does not have to be derived and sets of solutions found. Equivalently by preconditioning the inversion, we have made the process more efficient by removing the requirement to create multiple inversion results from which the right regularisation parameter is selected a posteriori.

In step 40, relative velocity changes across any time period can be calculated jointly inverting all the available vintages; although we can estimate velocity changes for every pair of survey, just a number of them equal to the number of the monitor surveys is independent.

The process of FIG. 4 was applied to surveys of a West African field. The base survey was carried out in the year 1999 as a high-resolution survey, with sampling of 2 ms. Production started in 2001, and the first monitor survey was carried out in 2002, using the same equipment as the base survey. A further monitor survey was carried out in 2004. Each survey comprises 2.5 million traces, of around 2000 samples each, which were windowed to 500 samples for the application of the method described herein, in the embodiment detailed above. The quality of the seismic over the field is outstanding with very low seismic noise, as well as low non-repeatability noise.

Figure 5A:
FIG. 5 shows the relative velocity changes over a reservoir for the period 1999 to 2004, (a) is calculated using the prior art and (b) is calculated using the process of the present invention.
Figure 5B:

For the time period between 1999 and 2004, the relative velocity changes have been calculated using the mono-monitor warping technique, using two seismic surveys as illustrated in FIG. 5(*a*). FIG. 5(*b*) shows velocity changes over the same time period, but obtained using multi-monitor warping according to the process of FIG. 4 on the three available surveys. The seismic line shown is very close to a gas injector. The white signal corresponds to gas which fills the channel, reducing the interval velocity. The areas highlighted in ellipses have been significantly improved because of the built-in redundancy. The multi-monitor warping technique naturally delivered a more stable signal, while the previous mono-monitor warping code, FIG. 5(*a*), has required over-regularisation. The multi-monitor warping, FIG. 5(*b*), intrinsically filters 4D noise and therefore stabilises the 4D signal.

Figure 6:
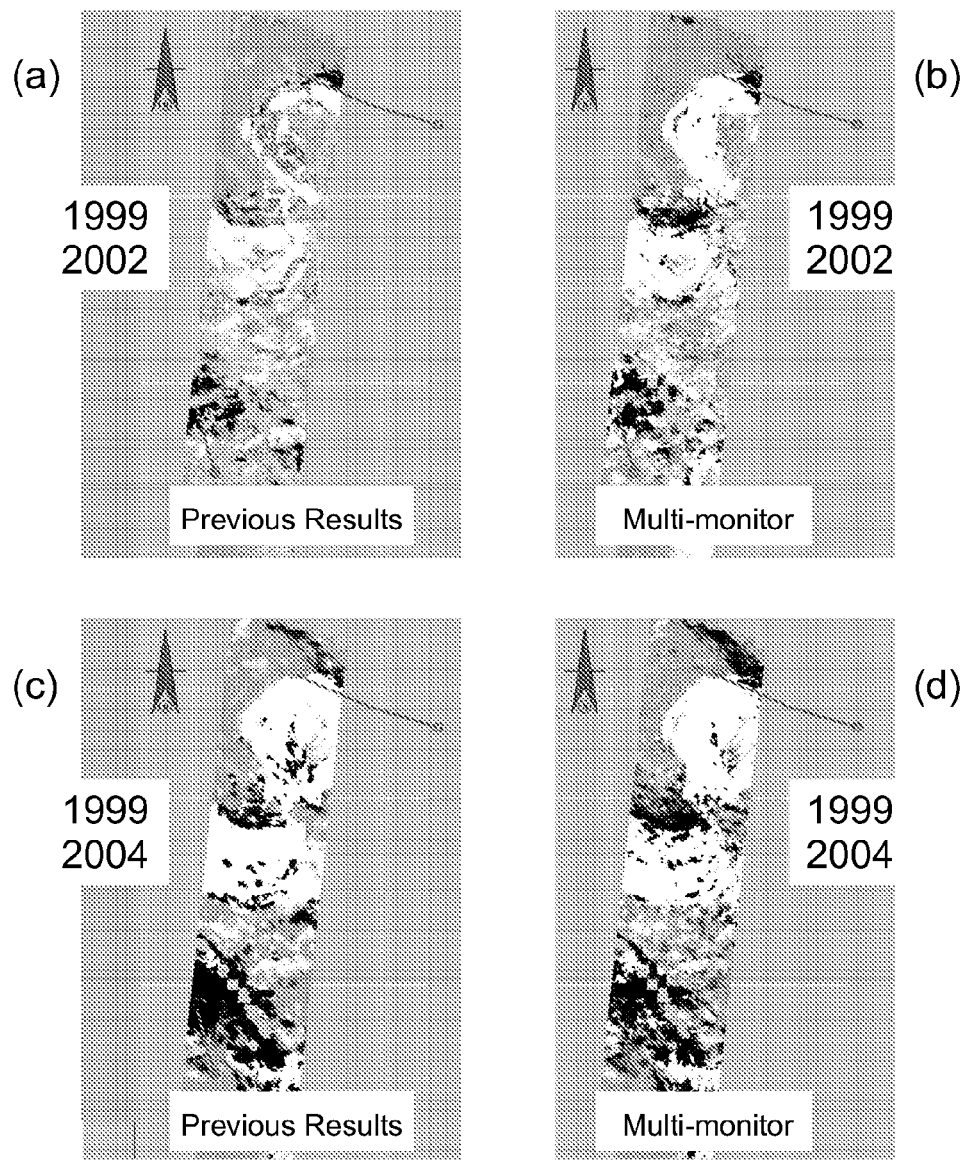
FIG. 6 shows the respective 4D effects on a reservoir for the period 1999 to 2002, using (a) prior art and (b) process of the present invention, and 1999 to 2004, using (c) prior art and (d) process of the present invention.

On the same reservoir, FIG. 6 shows the signed maximum value for a sequence where gas was injected. A time slice is shown. The gas injector is located at the top of each map (in the white (4D signal)) while a water injector is localised in the middle of each picture where the velocity increases (in black). We show, for the time period 1999 to 2002, mono-monitor results (a) and multi-monitor results (b). Additionally, for the time period 1999 to 2004, we show mono-monitor results (c) and multi-monitor results (d).

Referring initially to FIGS. 6(*c*) and (*d*), representing the velocity changes between 1999 and 2004, the changes are similar, although their frequency content is not the same. This is because of excessive low frequencies due to excessive regularisation for the mono-monitor warping.

The main improvement resides in the 4D changes computed between 1999 and 2002 at FIGS. 6(*a*) and (*b*), where both gas and water injections are better tracked by the multi-monitor warping. The multi-monitor results are improved especially when the 4D signal is weak or the repeatability is poor. This is because the survey redundancy is used to attenuate 4D noise.

We have also modelled a compacting reservoir on which four vintages of surveys, (1988, 1999, 2003 and 2006) are available. With mono-monitor warping, the 4D signal is found very hard to stabilise, due to subsidence which produces huge timeshifts, and to a gas cloud area that affects the elastic waves that propagate almost vertically. This provides a challenging dataset to validate the multi-monitor algorithm as described in FIG. 4. Several angle stacks (Near, Mid and far) were determined but only full stack results are shown here.

Figure 7A:
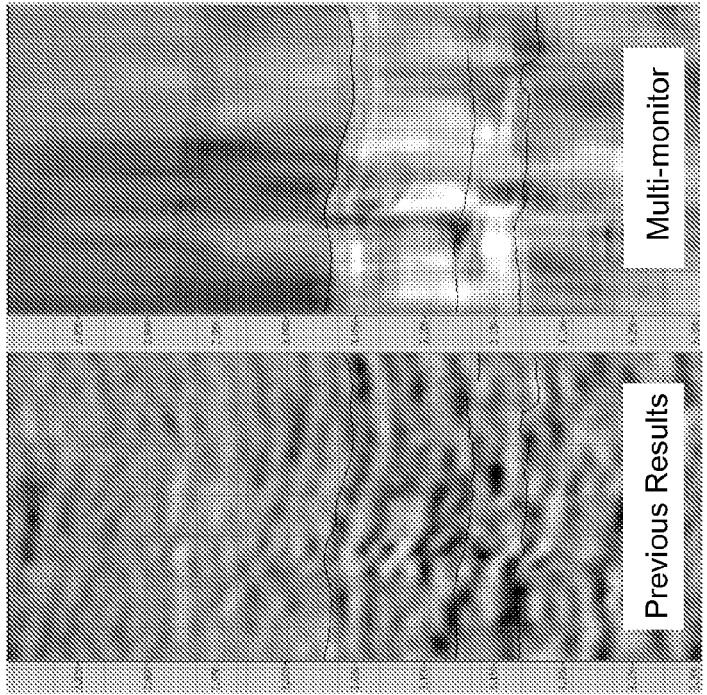
FIG. 7a shows the respective 4D effects on a further reservoir for the period 1988 to 2006, using (left) prior art and (right) process of the present invention.
Figure 7B:
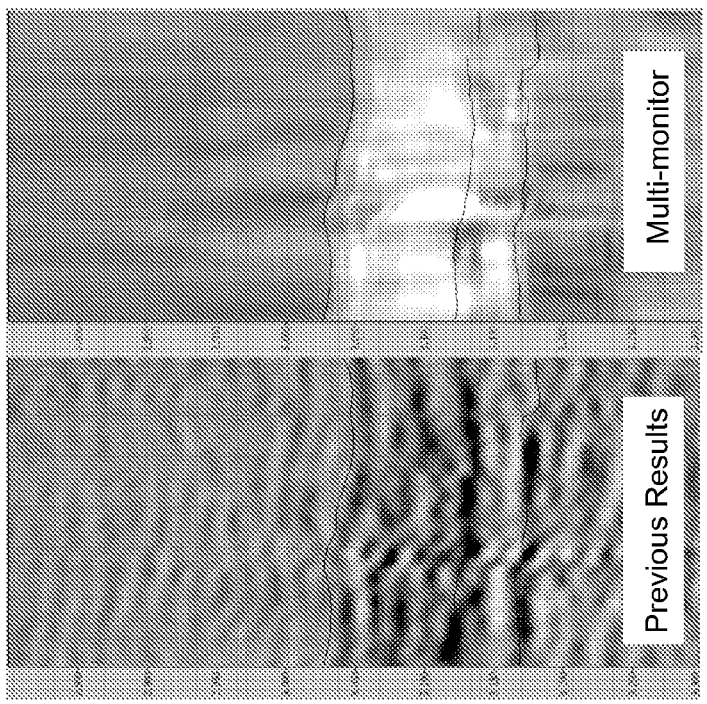
FIG. 7b shows the respective 4D effects on a further reservoir for the period 1999 to 2006, using (left) prior art and (right) process of the present invention.

FIG. 7 compares the previous results for the reservoir with the new results obtained using multi-monitor warping. FIG. 7(*a*) shows the results obtained between 2006 and 1988, the left panel has been obtained using mono-monitor warping of the two surveys, while the right panel has used the multi-monitor information from all four surveys. FIG. 7(*b*) shows the results obtained between 2006 and 1999, each panel has been obtained in the same processes as for FIG. 7(*a*).

The multi-monitor results are better constrained by the horizons represented in every panel, the first being the top reservoir and the last the bottom, close to the reservoir base. Although the mono-monitor warping results allow us to guess some 4D change, this signal is not reliable and definitely does not have the expected blocky character. The benefits of the multi-monitor process of the present invention appear even more evident on for this reservoir than for the West African reservoir of FIGS. 5 and 6. It is likely due to the fact that when the 4D signal is weak with respect to noise, the benefits of the multi-monitor over mono-monitor approach become more evident. Between 1999 and 2006, FIG. 7(*b*), the multi-monitor warping seems capable of extracting reliable 4D information in places where mono-monitor warping did not previously show evidence of a coherent 4D signal.

The process of the invention may be embodied in a computer program. The program is adapted to receive data for the base and monitor surveys, as well as data for the velocity fields; such data are in the format provided by state of the art computer packages known to those skilled in the art. The program runs the various steps of the process of FIG. 4.

A principal advantage of the present invention is that it provides a process for characterising the evolution of a reservoir, which uses all of the available seismic vintages together in the inversion process to improve the solution and facilitate the choice of the optimal regularisation parameters.

A further advantage of the present invention is that it provides a process for characterising the evolution of a reservoir which does not require a reservoir model and thus is data driven.

A yet further advantage of the present invention is that it provides a process for characterising the evolution of a reservoir which obtains the optimal regularisation parameters so that no intensive use of apriori knowledge is required.

A still further advantage of the present invention is that it provides a process for characterising the evolution of a reservoir which is appreciably faster to compute than the prior art. This is achieved from the objectivity in providing solutions which do not require interpretation to arrive at.

It will be appreciated by those skilled in the art that modifications may be made to the invention herein described without departing from the scope thereof. For example, while we have followed the cost function and regularisation kernel as taught in the prior art, any seismic match portion of the cost function and regularisation kernel can be selected to suit the data. Additionally while we have considered the evolution of a reservoir over monitored time periods and the changes when fluids are injected into the reservoir to aid production, it will be appreciated that the process can be used to monitor the injection of $CO_2$ into redundant wells.

The invention claimed is:

1. A process for characterising evolution of a reservoir over a time lapse by analyzing changes of seismic data wherein n surveys of the reservoir exist, where n>2, each survey of the n surveys having been taken at a different time within said time lapse and comprising a set of seismic traces, the process comprising:

inverting, via a computer, one or more seismic traces for each of the set of seismic traces from multiple survey pairs taken from the n surveys to obtain an estimate of the changes having occurred in the time lapsed between surveys of each survey pair, said inversion being performed by minimising an ill-posed function which includes at least one regularisation term to impose constraints on inverted parameters, the regularization term comprising a regularization weight;

repeating, via a computer, the inverting for a plurality of regularisation weights;

determining, via a computer, mismatches of terms of the ill-posed function in terms of a regularisation weight of the plurality of regularisation weights; and using the determined mismatches to determine an optimal regularisation weight for the at least one regularisation term that represents a best compromise between modelling the changes and imposing the constraints.

2. The process according to claim 1 wherein said function to be minimised is dependent on relative velocity changes, said function modelling time shifts in a seismic response of reflectors and associated changes in reflectivity between surveys of each survey pair.

3. The process according to claim 1 wherein said ill-posed function is defined as:

$$C = \|\bar{b} - \bar{m}_1\|_2^2 + \|\bar{b} - \bar{m}_2\|_2^2 + \|\bar{m}_1 - \bar{m}_2\|_2^2 + \\ \|\bar{b} - \bar{m}_3\|_2^2 + \|\bar{m}_1 - \bar{m}_3\|_2^2 + \|\bar{m}_2 - \bar{m}_3\|_2^2 + \ldots$$

and said at least one regularisation term; and where b is a base seismic trace from a first of said n surveys, and $m_n$ are subsequent traces from subsequent ones of said n surveys on which a shaping operator has been applied to compensate for time shift and 4D amplitude effects in order to match the base seismic trace.

4. The process according to claim 3 wherein a regularisation term occurring for each pair of surveys is added to the ill-posed function and thus minimised during inversion.

5. The process according to claim 3 wherein terms of the ill-posed function are weighted differently.

6. The process according to claim 3 wherein the ill-posed function is computed with a window restricted to contain a majority of 4D effects.

7. The process according to claim 1 wherein said inversion is carried out for interval time shift (time strain).

8. The process according to claim 7 wherein said ill-posed function is defined as:

$$C = \|\bar{b} - \bar{m}_1\|_2^2 + \|\bar{b} - \bar{m}_2\|_2^2 + \|\bar{m}_1 - \bar{m}_2\|_2^2 + \\ \|\bar{b} - \bar{m}_3\|_2^2 + \|\bar{m}_1 - \bar{m}_3\|_2^2 + \|\bar{m}_2 - \bar{m}_3\|_2^2 + \ldots$$

and said at least one regularisation term; and where b is a base seismic trace from a first of said n surveys, and $m_n$ are subsequent traces from subsequent ones of said n surveys on which a shaping operator has been applied to compensate for time shift in order to match the base seismic trace.

9. The process according to claim 8 wherein terms of the ill-posed function are weighted differently.

10. The process as claimed in claim 1 further comprising the step of using resultant data to aid hydrocarbon recovery from said reservoir.

11. A computer program residing on a non-transitory computer-readable medium, comprising computer program code means adapted to run on a computer all the steps of the process of claim 1.

12. Apparatus specifically adapted to carry out all the steps of the process of claim 1.

* * * * *